United States Patent [19]

Jamrus

[11] Patent Number: 4,489,036
[45] Date of Patent: Dec. 18, 1984

[54] APPARATUS FOR MEASURING FRICTION OF HYDRAULIC CONTROL ROD DRIVES IN NUCLEAR REACTORS

[75] Inventor: Kenneth J. Jamrus, San Jose, Calif.

[73] Assignee: General Electric Company, San Jose, Calif.

[21] Appl. No.: 369,182

[22] Filed: Apr. 16, 1982

[51] Int. Cl.³ .................................................. G21C 7/08
[52] U.S. Cl. .................................... 376/229; 376/230; 376/247
[58] Field of Search ...................... 376/247, 229–230; 73/9, 11

[56] References Cited

U.S. PATENT DOCUMENTS

| 3,442,759 | 5/1969 | Molle et al. | 376/229 |
| 3,446,067 | 5/1969 | Frantz et al. | 73/141 |
| 3,855,059 | 12/1974 | Groves et al. | 376/247 |
| 3,957,577 | 5/1976 | Treshow | 376/230 |
| 4,029,122 | 6/1977 | Jaegtnes | 73/9 |
| 4,131,010 | 12/1978 | Eyres | 73/11 |
| 4,202,209 | 5/1980 | Holmes | 73/11 |
| 4,232,427 | 4/1982 | Jamrus | 376/230 |
| 4,400,097 | 8/1983 | Koschnitzke et al. | 376/247 |

Primary Examiner—Sal Cangialosi
Attorney, Agent, or Firm—Ivor J. James, Jr.; Samuel E. Turner; Raymond G. Simkins

[57] ABSTRACT

An apparatus is disclosed which measures forces resisting the movement of pistons in a control rod drive mechanism in a nuclear reactor and which includes pressure sensing means and further includes hydraulic circuitry to divert pressurized fluid from a normal operating conduit to a selected shunt conduit containing a valve having a particular fluid control characteristic, said shunt conduit directing the fluid to a selected piston to move said piston and said pressure sensing means measuring the pressure of the fluid during the motion of said piston to give an indication of the force needed to achieve such motion.

6 Claims, 2 Drawing Figures

APPARATUS FOR MEASURING FRICTION OF HYDRAULIC CONTROL ROD DRIVES IN NUCLEAR REACTORS

The present invention relates to apparatus for measuring various forces exerted in an hydraulic piston drive system and, more particularly, to apparatus for measuring the cumulative effects of several simultaneously acting forces, including those of friction, occurring in hydraulic control rod drives in boiling water nuclear reactors.

A typical boiling water nuclear reactor employs control rods which are inserted into and withdrawn from the reactor's core to affect the rate of nuclear reaction. Typically, both the rods and the core are immersed in a bath of hot pressurized water and it is common to utilize the same water as an hydraulic fluid in pistons used to manipulate the control rods. In using such water the possibility of malfunction of the hydraulic system components is increased due to the fact that such water may contain undesired contaminants which tend to clog and deteriorate the seals, valves, and orfices contained in hydraulic systems. Further, even in a hydraulic system which utilizes pure water, which avoids this added contamination problem, a possibility of malfunction still exists and it is desired to have a means to test the system to obtain a measure of that possibility.

One important test of this kind is the measurement of the resistance to motion of the hydraulic system components under normal operating circumstances. The normal resistance to motion is caused, for example, by many contributing factors such as frictional resistance of a piston ring in moving along a piston cylinder, resistance due to the general viscous properties of hydraulic fluids, the resistance to laminar flow of a hydraulic fluid present between two contacting surfaces, and the resistance due to the presence of abrasive foreign particles in a hydraulic fluid contained between two finely machined moving surfaces.

Measurement of the resistance to motion of a component subject to the above-noted types of forces can be used to provide an indication of the total forces acting on the component under test. If the measured value exceeds an expected value computed by theory or based on experience, a potential hazard can be deemed to exist and corrective measures can be taken.

SUMMARY OF THE INVENTION

Accordingly, it is an object of the present invention to provide a testing apparatus to indicate the presence of intolerable forces such as abnormal friction in a nuclear reactor hydraulic drive so that failure of the drive can be anticipated and avoided.

It is a further object of the present invention to provide a new and improved friction measuring apparatus which can be permanently installed in the existing hydraulic lines of a nuclear reactor.

It is a further object of the present invention to provide a new and improved friction measuring apparatus which requires minimal exposure of a human operator to a radioactive environment.

It is a further object of the present invention to provide a new and improved friction measuring apparatus which has essentially no effect on the standard operation of the reactor's hydraulic drive systems when the testing procedure is not in progress.

It is a further object of the present invention to provide a new and improved friction monitoring apparatus which can measure different kinds of friction components in an hydraulic control rod drive mechanism.

The foregoing objects as well as others are achieved by the present invention wherein pressurized water which acts as a propellant for a piston the resistance of which is to be measured is alternately shunted through three different valve means along the route from a source of pressure to the piston. Each valve means has a different fluid control capability.

A first valve means is preferably an electric solenoid valve which is capable of rapid shut-off in the range of a few milliseconds. When open, such a valve allows normal insertion of a control rod piston (herein referred to as an index tube piston) but at the instant of closing, the valve allows almost immediate termination of fluid pressure and flow, and thus rapid reversal of the direction of motion of the control rod piston due to the effect of gravity acting on the related driveline components. The reversed motion continues until it is halted by the ratchet action of a collet pawl engaging a notch in an index tube connected to the piston.

A second valve means is preferably a ball valve which allows complete opening and closing with a 90-degree manual turn of the actuating shaft thereof. Rapid opening and closing of this valve allows cyclic variation in fluid pressure to provide cyclic motion of a collet piston associated with the above-mentioned collet.

A third valve means is preferably a needle valve or a metering valve which operates to provide precisely determined fluid flow to cause slow drift of a control rod piston in the direction of insertion. Measurement of the resistance to motion of the above piston provides an indication of whether or not it is functioning properly.

To measure the forces of resistance acting during the time when a particular test is undertaken, a pressure differential is measured between a reference pressure and a pressure indicative of that applied to the particular piston under scrutiny. The pressure differential provides an indication of the net forces required to move the particular piston, thus indicating the net forces acting in opposition. A deviation in the pressure measured from a normal pressure indicates the existence of a potential hazard.

DETAILED DESCRIPTION OF THE INVENTION

Figure 1:
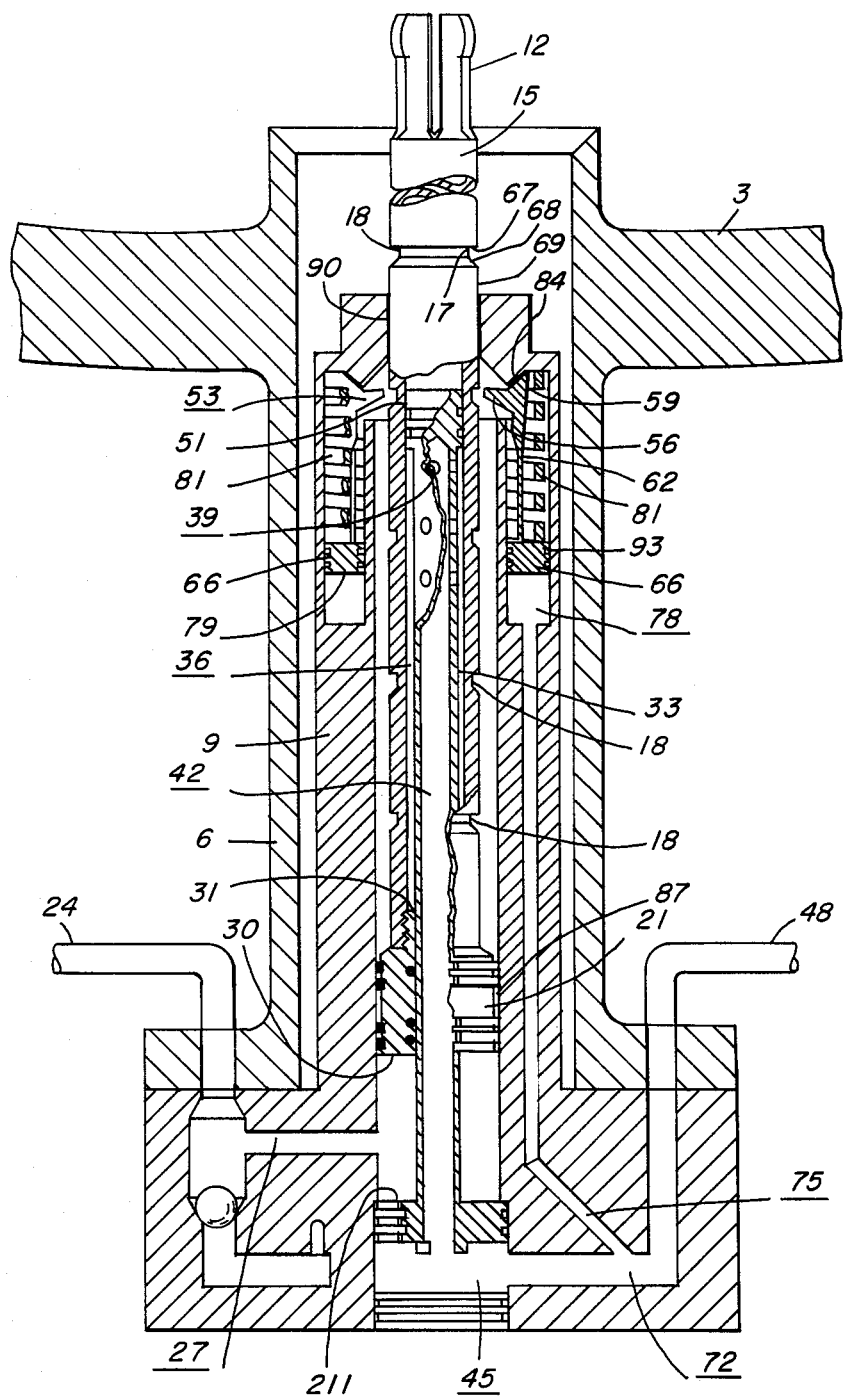
FIG. 1 depicts an hydraulic control rod apparatus of the prior art type with which the present invention is adapted to be used.

Referring to FIG. 1, part of the containment vessel 3 of a boiling water nuclear reactor is shown. Contained within a housing 6 attached to the containment vessel 3 is an hydraulic control rod drive mechanism generally designated 9. A control rod (not shown) would normally be connected to a coupling spud 12. The coupling spud 12 is attached to the upper end of index tube 15. The index tube 15 is formed with a plurality of annular index notches 18 spaced along the length thereof. At the lower, opposite, end of the index tube 15 is connected an index tube piston 21. Hydraulic circuitry for effecting the insertion and withdrawal the index tube 15 relative to the containment vessel 3 is constructed and operated as follows: During insertion, pressurized water enters a first inlet 24 and flows through a passage 27 to contact one side 30 of an index tube piston 21 to force the index tube piston 21, index tube 15, and coupling spud 12 all to slide upward on piston tube 33, thus pushing the control rod (not shown) in the direction of insertion into the containment vessel 3. Simultaneously, water present in a chamber 36 between index tube 15 and piston tube 33 is forced through orifices 39 into a piston tube center chamber 42, through a passage 45, and out through a second inlet 48. Evacuation of chamber 36 is accomplished inasmuch as the volume of chamber 36 is diminished during the insertion of the index tube because such volume is determined partially by the distance between the top 31 of index tube piston 21 and the bottom of a fixed piston 51 and the distance decreases upon insertion of index tube piston 21.

As index tube piston 21 moves upwardly, collet 53 acts by a ratchet action to allow insertion of index tube 15. In FIG. 1 only two such collets are shown but it is to be understood that preferably a plurality of collets are provided fitting loosely on index tube 15. The ratchet action is provided by means including a collet 53 which comprises a multi-function pawl including a nose portion 56, an ear portion 59, and a neck portion 62. The neck portion 62 is fastened to a collet piston 66 and the neck portion 62 is formed of a resilient material serving to urge the nose portion 56 into contact with index notches 18. As the index tube 15 slides in the direction of insertion the nose portion 56 of collet 53 follows the outer contour of the index tube 15 from the bottom 17 of index notch 18, then along a camming surface 68 (which pushes nose portion 56 outward from the index tube 15), then to the outer periphery 69 of index tube 15, and then back again to the bottom 17 of the next index notch 18, should the index tube travel far enough. When the nose 56 is engaged with a ratchet surface 67 of index notch 18 it serves as a detent and withdrawal of index tube 15 is thereby prevented.

To allow withdrawal of the index tube the following sequence of events is undertaken. As mentioned, the engagement of nose 56 with the ratchet surface 67 prevents withdrawal of the index tube 15. This is due to, first, the forces of friction of nose 56 against ratchet surface 67 together with, second, the downward forces resulting from the weitht of the index tube 15 and control rod exerted against the nose 56, all of which types of forces make it impossible to disengage nose 56 from notch 18 when withdrawal is desired. To achieve withdrawal, a slight insertion of the index tube is first undertaken to relieve the binding engagement of nose 56 in notch 18. That is, a brief fluid pulse is transmitted to first inlet 24 to push the index tube 15 a short distance in the direction of insertion. At this time, nose 56 will be free of binding engagement with index notch 18 and immediately fluid pressure is then simultaneously applied to second inlet 48 and removed from first inlet 24. This can be accomplished by a selector valve 68 shown in FIG. 2 which allows a fluid channel to be selectively defined between selector valve inlet 69 and either of first inlet 24 or second inlet 48 but not both simultaneously.

Fluid pressure from inlet 48 is directed along two channels at a junction 72. The junction 72 leads to previously mentioned channel 45 and also to a third inlet 75. Third inlet 75 communicates with a chamber 78 which brings fluid into contact with a collet piston 66. Fluid pressure against a bottom surface 79 of collet piston 66 pushes collet piston 66 upward against the biasing action of a spring 81 (which tends to push collet piston 66 downward) and, at the same time, the motion of the collet piston forces ear portion 59 of collet 53 into engagement with flange 84 thus pushing collet 53 outward and away from the surface of index tube 15 therefore causing disengagement or release of nose 56 from notch 18. This frees the index tube for withdrawal from the containment vessel.

During withdrawal of the index tube, pressurized water flows from second inlet 48, past junction 72, through channel 75 to collet piston 66 and simultaneously through channel 45, through piston tube center chamber 42, through orifices 39 and into chamber 36 located between index tube 15 and piston tube 33. The entry of fluid into chamber 36 results in the application of pressure to the top 31 of index tube piston 21 forcing it downward, which in turn expels out of first inlet 24 water contained in passage 27 through a vent not shown.

Various types of resistance to actuation are encountered by the above mentioned pistons and are generally sought to be measured for reliability testing. First, when the index tube 15 is freely moving in the direction of withdrawal it will continue to do so until collet nose 56 engages an index tube notch 18. A measurement is made of the net resistance to motion in this direction but at a time when collet nose 56 contacts and slides along the outer surface 69 of index tube 15 (that is, when insufficient liquid pressure is applied to the bottom of collet piston 66 to disengage nose 56 from index tube 15). The measurement is deemed a useful index of proper functioning of the index tube piston and the resistance measured is termed "settle friction." Settle friction includes but is not limited to forces resisting motion due to the following sources: friction between index tube piston 21 and the walls of piston cylinder 87; friction of the inner surfaces of index tube piston 21 and the outer surfaces of piston tube 33; friction between the outer surfaces of index tube 69 and sleeve surfaces 90; as well as resistances to flow caused by contortions and constrictions in passages such as 27. Second, a measurement of the resistance to motion encountered by collet piston 66 in moving up and down over its range of travel, termed "collet friction," is deemed a useful indication of collet piston functioning. The sources of resistance include but are not limited to the following: friction between collet piston 66 and cylinder wall 93; the resistance due to downward thrust of spring 81; the friction between collet ear 59 and flange 84; as well as the resistance to fluid flow due to convolutions and strictures provided in fluid channels such as third inlet 75. Third, a measurement of the friction encountered by index tube 15 in drifting slowly in the direction of insertion is considered a useful measure of system performance and is termed "drift friction". This friction is due to resistances caused by, but not limited to, the following: friction between the outer surface of index tube piston 21 and cylinder wall 87; friction between the outer surface of index tube 69 and collet nose 56; friction between outer surface of index tube 69 and sleeve surface 90 as well as the resistance to fluid flow caused by strictures and turbulance in fluid channels such as passage 27.

Figure 2:
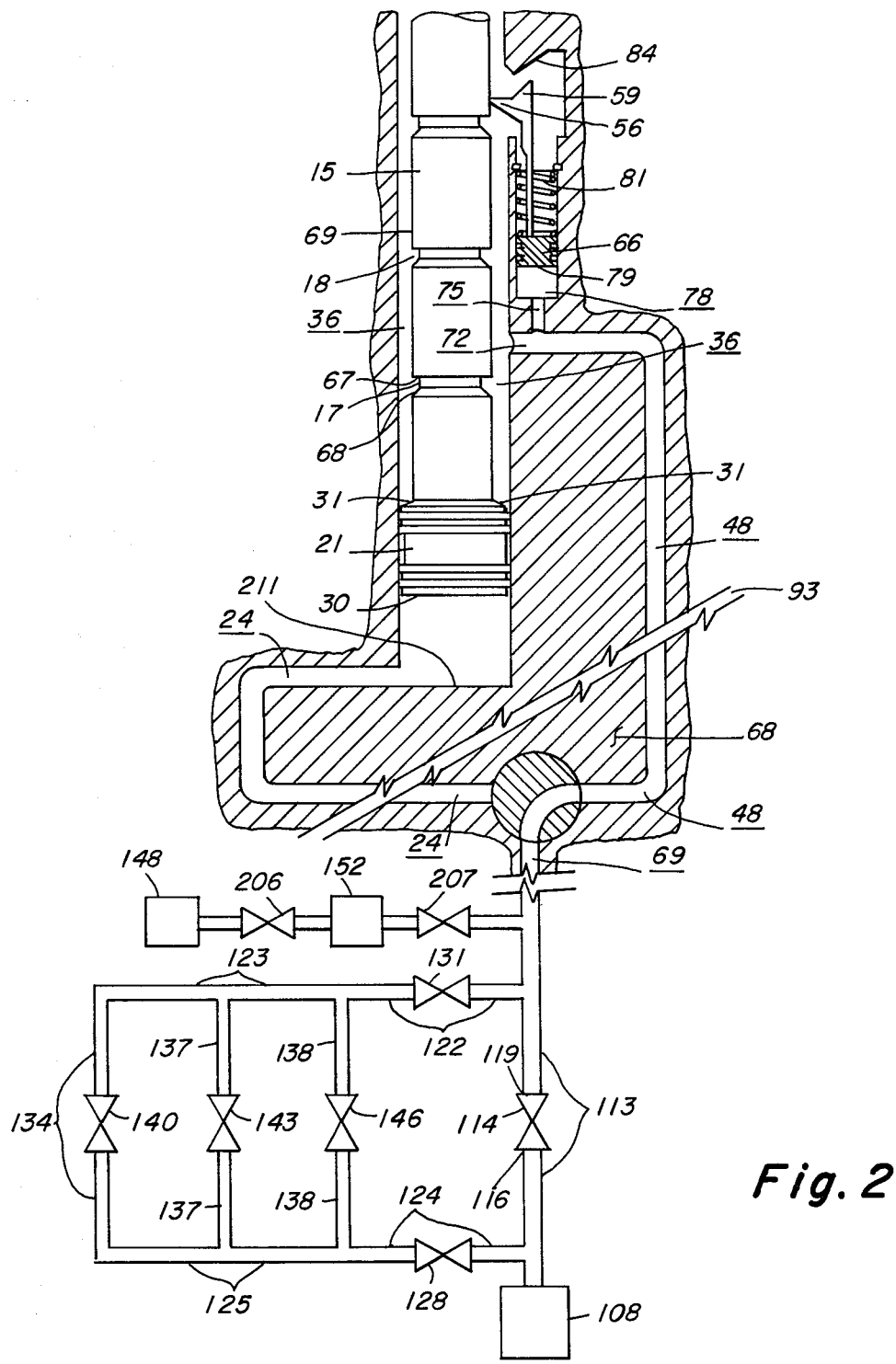
FIG. 2 depicts by schematic diagram an apparatus embodying the present invention.

The prior art type hydraulic drive mechanism of FIG. 1 is shown in simplified schematic form in a portion of FIG. 2, wherein the prior art drive mechanism is that shown above the break designated 93. In simplified form, the above described functioning of the drive mechanism can be explained as follows: to drive the index tube 15 in the direction of insertion, a selector valve 68 is adjusted such that the inlet 69 of selector valve 68 is connected with first inlet 24. Pressurized liquid applied to selector valve inlet 69 is conducted along first inlet 24 to the bottom surface 30 of index tube piston 21 thus pushing both index tube piston 21 and the connected index tube 15 in the direction of insertion (that is, upward). Collet nose 56 will follow the outer contour of index tube 15 along index notches 18 and index tube outer surface 69 as the index tube travels upward. Engagement of collet nose 56 with index notch 18 prevents index tube withdrawal.

To undertake withdrawal of index tube 15, disengagement of collet nose 56 from index notch 18 must first be accomplished. This is done by first assuring that selector valve 68 is positioned to connect inlet 69 thereof with first inlet 24 and then by pulsing liquid pressure to selector valve in 69 to push the index tube 15 slightly in the direction of insertion, for thus freeing collet nose 56 from binding engagement with index notch 18. Immediately thereafter, selector valve 68 is adjusted such that selector valve inlet 69 is connected with second inlet 48 in order that fluid pressure is applied to junction 72 and then to third inlet 75 and from that point is applied to the bottom surface 79 of collet piston 66, causing collet piston 66 to travel in an upward direction against collet spring 81, forcing collet ear 59 against flange 84 to push collet nose 56 outward and away from possible engagement with index notch 18. At the same time pressurized fluid flowing through second inlet 48 from junction 72 and through various intermediate paths (not shown in FIG. 2) to chamber 36 (shown) and then contacting the top surface 31 of index tube piston 21 serves to push the index tube downward, that is, in the direction of withdrawal. The water present in first inlet 24 is allowed to escape through a vent not shown.

To test the three friction components identified above, namely settle friction, collet friction, and drift friction, hydraulic fluid flow of the drive mechanism is controlled and measured by the fluid circuitry illustrated schematically at the bottom of FIG. 2. In this circuitry a pressurized liquid source 105 is connected to selector valve inlet 69 by a conduit 113. Interconnected in conduit 113 is a control valve 114 having an inlet 116 and an outlet 119. A conduit 122 connects outlet 119 to shunt junction 123 and conduit 124 connects inlet 116 to shunt junction 125. Interconnected in conduit 124 is isolation valve means 128 and interconnected in conduit 122 is isolation valve means 131. Between shunt valve junctions 123 and 125 are connected, in parallel, conduits 134, 137, and 138.

Interconnected in conduit 134 is first shunt valve means 140, which is preferably the solenoid valve means described above. Inconnected in conduit 137 is second shunt valve means 143 which is preferably the ball valve means described above. Interconnected in conduit 138 is third shunt valve means 146 which is preferably the needle valve or metering valve means described above. Connected between selector valve inlet 69 and a source of reference pressure 149 is a pressure sensing means 152. Pressure sensing means isolation valves 206 and 207 are provided to isolate pressure sensing means 152 from selector valve inlet 69 and from the source of reference pressure 149 if desired.

The operation of the disclosed embodiment is as follows: During normal operation of the hydraulic control rod drive system, the control valve 114 is open, thus connecting inlet 116 thereof with its outlet 119, and both isolation valve means 128 and 131 are closed. Thus, both shunt valve junctions 123 and 125 are disconnected from conduit 113. Further, during normal operation, pressure sensing means 152 is preferably iosolated from selector valve inlet 69 and source of reference pressure 149 by closure of pressure sensing means isolation valves 206 and 207. Thus, in normal operation, pressurized liquid has a relatively unimpeded flow path from pressurized liquid source 105 to selector valve inlet 69.

To measure settle friction the following steps are undertaken. Control valve 114 is closed, both isolation valve means 128 and 131 are opened, and first shunt valve means 140 is used to control fluid flow between pressurized liquid source 105 and selector valve inlet 69. (The order of operating shunt valve means 140, 143 and 146 is not critical and the choice of firstly operating first shunt valve means 140 is wholly arbitrary.) Thus, pressurized liquid flow is now eliminated from control valve 114 and instead diverted through shunt junction 125, first shunt valve means 140, shunt junction 123, and then to selector valve inlet 69. Selector valve 68 is adjusted so that liquid flow is directed from selector valve inlet 69 to first inlet 24. Pressurized liquid now flows from pressurized liquid source 105 through the path just described to the bottom surface 30 of index tube piston 21 to drive index tube piston in the direction of insertion.

A brief pulse of pressurized liquid is applied by pressurized liquid source 105 to drive the index tube 15 a desired distance in the direction of insertion, but not to the point of engaging an index tube notch 18 with collet nose 56, as this would prevent withdrawal of index tube 15. Then first shunt valve means 140, which is preferably a rapid-closing electric solenoid valve, is closed, allowing the index tube to withdraw until withdrawal is halted by ratchet action of collet nose 56. During the period of time of withdrawal, settle friction is measured as follows: Pressure sensing means isolation valves 206 and 207 are both opened and pressure sensing means 152 is used to measure the pressure differential between inlet 69 and source of reference pressure 149. For greater accuracy, a repetition of the above sequence of valve manipulations can be repeated with accompanying repetitions of meter readings.

To measure collet friction the following steps are undertaken: Index tube piston 21 is driven to its farthest position of withdrawal so that index tube piston surface 30 is as close as possible to surface 211. This is done by operating the hydraulic drive apparatus in the normal manner of withdrawal, that is, with isolation valves 128 and 131 closed, control valve 114 open, and selector valve 68 connecting selector valve inlet 69 with second inlet 48. When index tube piston 21 is positioned at the farthest position, close 114 open 131, 128 second shut valve means alone is operated in the following manner. This shut valve means is preferably a ball valve which can be changed from a fully opened to a fully closed position with 90° of one full turn of its actuating shaft. Alternate manual operation of the valve between these two positions will alternately apply high pressure and low pressure to collet piston 66 thus forcing it upward a small amount and then releasing it to spring back downward to its former piston under the influence of collet spring 81. It is during the upward and downward motion of the collet piston that a pressure differential between inlet 69 and source of reference pressure 149 is measured by pressure sensing means 152 to given an indication of collet friction.

Drift friction is measured in the following manner: Selector valve 68 is positioned to connect inlet 69 with first inlet 24. Control valve 114 is closed and isolation valve means 128 and 131 are open. Third shunt valve means 146 which is preferably a needle valve or a metering valve is adjusted until sufficient pressurized liquid flows through it to index tube piston 21 to achieve slow drift of the index tube in the direction of insertion. During this time collet nose 56 will be in contact with and follow the outer perimeter 69 of index tube 15. A reading of the pressure differential between inlet 69 and source of reference pressure 149 is taken from pressure sensing means 152, giving an indication of the net pressure required to attain drift of index tube 15 in the direction of insertion.

While a preferred embodiment of the present invention has been disclosed herein, it is to be understood that various modifications and embodiments thereof can be realized by persons skilled in the art without departing from the present invention. Accordingly, it is desired to secure by the appended claims, all modifications falling within the true spirit and scope of this invention.

I claim:

1. In an hydraulic drive system for insertion and withdrawal of control rods in a nuclear reactor vessel and having associated with each of said control rods a rod-supporting index tube, an index tube piston connected to said index tube, a movable collet engageable with said index tube, means biasing said collet into engagement with said index tube, a collet piston connected to said collet, a first inlet effective to apply pressurized liquid to one side of said index tube piston to actuate said index tube in the direction of insertion, a second inlet effective to apply pressurized liquid to the opposite side of said index tube piston to actuate said index tube in the direction of withdrawal, a third inlet effective to apply pressurized liquid to said collet piston to overcome said biasing means and move said collet out of engagement with said index tube, and a selector valve connectable to a pressurized liquid source and effective to selectively admit pressurized liquid from said source alternatively to said first inlet or both said second and third inlets, apparatus for measuring the resistance of said pistons to actuation comprising:
   (a) at least two conduits connecting an inlet of said selector valve of said pressurized liquid source;
   (b) control valve means in a first of said conduits and selectively operable between a closed position and a normal operating position allowing liquid flow therethrough sufficient for effecting the withdrawal and insertion of a plurality of said control rods;
   (c) shunt valve means in a second of said conduits and controllable for adjusting the flow of liquid therethrough to control the rate of travel of actuated pistons; and
   (d) pressure-sensing means effective to indicate the difference between a reference pressure and the pressure of liquid at the inlet of said selector valve.

2. Apparatus according to claim 1, further comprising isolation valve means effective to selectively prevent and permit liquid flow through all of said shunt valve means.

3. In an hydraulic drive assembly used for insertion and withdrawal of control rods in a nuclear reactor vessel and having associated with each of said control rods a rod-supporting index tube, an index tube piston connected to said index tube, a movable collet engageable with said index tube, means biasing said collet into engagement with said index tube, a collet piston connected to said collet, a first inlet effective to apply pressurized liquid to one side of said index tube piston to actuate said index tube in the direction of insertion, a second inlet effective to apply pressurized liquid to the opposite side of said index tube piston to actuate said index tube in the direction of withdrawal, a third inlet effective to apply pressurized liquid to said collet piston to overcome said biasing means and move said collet out of engagement with said index tube, and a selector valve connectable to a pressurized liquid source and effective to selectively admit pressurized liquid from said source alternatively to said first inlet or both said second and third inlets, apparatus for measuring the resistance of said pistons to actuation comprising:
   (a) a plurality of conduits connecting an inlet of said selector valve to said pressurized liquid source;
   (b) control valve means in a first of said conduits and selectively operable between a closed position and a normal operating position allowing liquid flow therethrough sufficient for effecting the withdrawal and insertion of plurality of said control rods;
   (c) first shunt valve means in a second of said conduits and controllable for abruptly stopping the flow of liquid therethrough to enable sudden reversal of direction of travel of said index tube piston;
   (d) second shunt valve means in a third of said conduits and controllable for abruptly starting and stopping flow of liquid therethrough to achieve cyclic motion of said collet piston to cyclically engage and disengage said collet with said index tube;
   (e) third shunt valve means in a fourth of said conduits and controllable for precisely varying the flow of liquid therethrough to achieve slow drift of said index tube piston in the direction of insertion; and
   (f) pressure-sensing means effective to indicate the difference between a reference pressure and the pressure of liquid at the inlet of said selector valve.

4. Apparatus according to claim 3, further comprising isolation valve means effective to selectively prevent and permit liquid flow through all of said first, second and third shunt valve means.

5. In an hydraulic drive assembly used for insertion and withdrawal of control rods in a nuclear reactor vessel and having associated with each of said control rods a rod-supporting index tube, an index tube piston connected to said index tube, a moveable collet engageable with said index tube, a collet piston connected to said collet, a first inlet effective to apply pressurized liquid to one side of said index tube piston to actuate said index tube in the direction of insertion, a second inlet effective to apply pressurized liquid to the opposite side of said index tube to actuate said index tube in the direction of withdrawal, a third inlet effective to apply pressurized liquid to said collet piston to overcome said biasing means and move said collet out of engagement with said index tube, and a selector valve connectable to a pressurized liquid source and effective to selectively admit pressurized liquid from said source alternatively to said first inlet or both said second and third inlets, apparatus for measuring the resistance of said pistons to actuation comprising:
(a) a plurality of conduits connecting an inlet of said selector valve to said pressurized liquid source;
(b) control valve means in a first of said conduits and selectively operable between a closed position and a normal operating position allowing liquid flow therethrough sufficient for effecting the withdrawal and insertion of a plurality of said control rods;
(c) solenoid shunt valve means in a second of said conduits and controllable for abruptly stopping the flow of liquid therethrough to enable sudden reversal of direction of travel of said index tube piston;
(d) globe shunt valve means in a third of said conduits and controllable for abruptly starting and stopping flow of liquid therethrough to achieve cyclic motion of said collet piston to cyclically engage and disengage said collet with said index tube;
(e) metering shunt valve means in a fourth of said conduits and controllable for precisely varying the flow of liquid therethrough to achieve slow drift of said index tube piston in the direction of insertion; and
(f) pressure-sensing means effective to indicate the difference between a reference pressure and the pressure of liquid at the inlet of said selector valve.

6. Apparatus according to claim 5, further comprising isolation valve means effective to selectively prevent and permit liquid flow through all of said shunt valve means.

* * * * *